April 16, 1929.  J. PLATT  1,709,038
CARDING SURFACE
Filed March 21, 1928
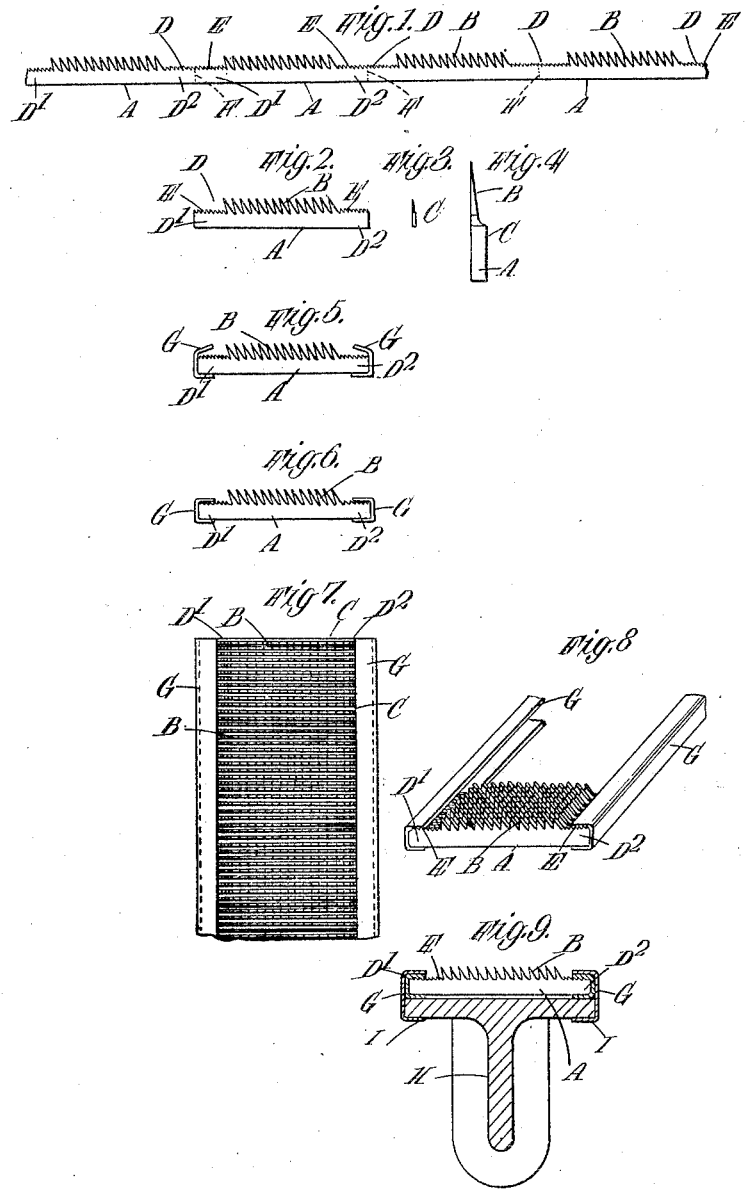

Patented Apr. 16, 1929.

1,709,038

UNITED STATES PATENT OFFICE.

JOHN PLATT, OF HARROW, ENGLAND.

CARDING SURFACE.

Application filed March 21, 1928, Serial No. 263,511, and in Great Britain March 31, 1927.

This invention relates to carding surfaces which comprise or are constituted by a number of toothed strips or the like arranged or assembled side by side to form a length or section of toothed surface for use as or for application to a flat such as used in some carding machines. The chief object of the present invention is to provide an improved toothed surface of this kind for carding flats or the like and to provide improvements in connection with the manufacture of the toothed strips, or the like and also in connection with the assembling or securing of the said toothed strips or the like to form the improved carding surface.

According to this invention the toothed strips or the like which are assembled side by side to form the improved carding surface for the flats, are each formed with end portions or projections that extend beyond a series of completely formed teeth, the upper edges of said projections or extensions being in line or substantially in line with the base of the teeth. The said projections or extensions are of sufficient length to enable binding or clipping means to be applied along the ends of the assembled strips for securing the latter together to form a complete unit. The projections or extensions of the toothed strips may be formed by the removal or omission of some of the teeth and in one method of manufacture the several toothed strips are cut from a continuous length of strip material which is formed with the teeth in any suitable or usual manner such as is employed in connection with the manufacture of continuous toothed or serrated wire or strips used for winding on cylinders, doffers and other rollers of carding engines and at certain intervals on the said contiuous length of strip, gaps or untoothed portions are provided between the different sets of teeth. The said continuous strip may then be divided or cut at the portions where the said gaps are provided to form the separate toothed strips or sections and the end or untoothed portions constitute the aforesaid projections or extensions. The separate toothed strips or sections are cut to the same length, and they can be arranged side by side with the teeth in alignment (or otherwise if desired) and with the said projections or extensions so disposed as to be secured together, for example by channel-sectioned binding clips to form a complete unit ready for attachment or application to a flat of suitable or usual construction. The said projections or extensions may be slightly serrated or similarly formed to provide a roughened edge to ensure that the channel-sectioned clips securely grip the said projections or extensions. The carding surfaces or units formed in the manner aforesaid may be made in any desired lengths and they may be secured or affixed to the carding flats in any appropriate manner, in one example, binding clips of channel section may be used to clamp the said carding surfaces or units to the flat.

In order that the said invention may be clearly understood and readily carried into effect, the same will now be more fully described with reference to the accompanying drawings in which:—

Figure 1 represents a length of toothed strip from which are produced the separate short toothed strips or sections required to constitute the improved carding surface for the flats or the like.

Figure 2 is a side view of one of the toothed strips or sections cut from a length of strip such as shown in Figure 1.

Figure 3 is an end view of the toothed strip or section shown in Figure 2.

Figure 4 is an enlarged end view of the said toothed strip or section.

Figure 5 is a side view showing the toothed strips or sections in channel shaped clips or guides.

Figure 6 is a side view showing the toothed strips or sections in channel shaped clips which have been compressed so as to secure the several toothed strips or sections together.

Figure 7 is a plan view of the assembled toothed strips or sections in the binding clips.

Figure 8 is a perspective view showing a few of the toothed strips or sections in the binding clips.

Figure 9 is a sectional view of a flat with the improved toothed surface or unit applied thereto.

The toothed strip which is used for the purpose of the present invention may be somewhat similar to the known continuous toothed or serrated wire or strip which is wound round cylinders, doffers and other rollers of carding engines, that is to say, it may comprise a base or foundation A from which extend rigid or pointed teeth B which are inclined at a suitable angle and are suitably shaped or formed for carding the said foundation being slightly thicker than the upper part on which the teeth are formed so as to provide a distance piece C for enabling the rows of teeth B to be separated when the toothed strips are arranged side by side as is well known in the production of carding surfaces on cylinders, swifts, doffers etc. The foundation A as shown is more in the nature of a flat strip than the wire like foundation of the known toothed wire or strip which is wound round the cylinders, doffers and other rollers of carding engines, but the foundation may for the purpose of the present invention be made of suitable wire-like formation. In the example illustrated the toothed strip or sections as shown in Figure 2 are cut from a continuous strip which instead of being provided with teeth B entirely along its upper edge is formed with sets of teeth at predetermined positions as shown in Figure 1 to provide gaps between the said sets of teeth during the manufacture of the strip so as to provide alternating sets of teeth B and gaps D as illustrated. The upper edge of the strip at the gap D may however be serrated or similarly formed as shown at E. The said strip as shown in Figure 1 may be fed forward by suitable means to a cutting device in such manner that the strip is cut across the gapped portions midway between the different sets of teeth as indicated by the dotted lines F in Figure 1, so as to provide a series of sections or short lengths such as shown in Figure 2, each of which has the end projections or extensions D' and D² whose upper serrated edges E are in line with the base of the teeth B. As the strips shown in Figure 2 are cut (or subsequently) they are placed in channel guides or clips such as G, see Figure 5, so that they are arranged side by side with the rows of teeth separated by reason of the aforesaid distance piece C on the foundation A of each strip. The said channel clips or guides G may be such that they can be secured by compression to grip the ends or projections of the said strips as shown in Figure 6 and the serrated end projections D' and D² enable the clips to be securely united or held on to the ends of the assembled strips thus providing the carding surface or unit for application to the flat. The carding surfaces or units constituted by the assembled strips may be made to any desired length and one or more of such surfaces or units may be disposed along the upper surface of a flat H such as shown in Figure 9 and may be secured thereto in any appropriate manner for example by means of channel-sectional binding clips I which grip the binding clips G as shown and may extend along the whole length of the flat or may be provided at intervals for holding the said toothed surface or surfaces in position. The assembled strips or units may be hardened in any suitable manner so as to avoid the operation of hardening only the teeth of the strips prior to assembling. If desired however, hardening of the teeth only may be effected and the hardening operation may be carried out prior to the assembling of the strips.

What I claim and desire to secure by Letters Patent of the United States is:—

1. A carding surface for flats, comprising a number of toothed strips assembled side by side to form any desired length of carding surface for application to the body of a flat, each said strip having a foundation that is thicker than the teeth thereon, so as to separate the rows of teeth when the strips are assembled, and which thickened portions extend beyond the end teeth on the strip to provide untoothed ends that can be secured to hold the strip in assembled form.

2. A carding surface for flats, comprising a number of toothed strips assembled side by side to form any desired length for application to the body of a flat, each of the said strips having untoothed portions extending beyond completely formed end teeth and the upper edges of which are substantially in line with the bottom of the teeth, spacing means on said strips so that the several rows of teeth are separated from each other, and means connecting said end portions to retain the strips side by side.

3. A carding surface for flats, comprising a number of toothed strips each having a foundation from which extends upward a set of straight, rigid and pointed teeth all inclined in the same direction, the said foundation being thicker than the teeth to separate the strips, each strip having untoothed end portions extending from the said foundation beyond completely formed end teeth, and clamping means securing the untoothed portions together to retain the toothed strips side by side, the said clamping means being disposed well below the points of the teeth.

4. A carding surface for flats, comprising a number of toothed strips, each having a foundation from the upper face of which extend straight, rigid and pointed teeth, all inclined in the same direction, the said base being thickened so that the rows of teeth in the carding surface will be separated, each strip having end portions extending from its base, and channel shaped clips engaging said end portions, the upper edges of the latter being serrated to ensure that the clamping means securely engage the strips.

5. A carding surface for flats, comprising a number of toothed strips, each having a foundation from which extend upwardly straight, rigid and pointed teeth all inclined in the same direction, the said foundation being thickened to cause the rows of teeth in the carding surface to be separated, end portions extending from each said foundation, channel shaped clips engaging said end portions, the upper edges of the latter being serrated to ensure that the clamping means securely hold the same together, and means whereby the carding surface constituted by the secured strips can be attached to the body portions of flats.

6. A method of making carding surfaces for flats, comprising forming a plurality of sets of teeth on a strip and providing gaps between the sets of teeth, dividing the said strip between the sets of teeth, assembling the divided strips side by side, and connecting the assembled strips to provide a carding surface.

7. A method of making carding surfaces for flats, comprising forming a strip of such cross section as to provide a thickened base, and a series of teeth of less thickness at their inner ends than said base, the teeth being arranged in a plurality of groups spaced apart longitudinally of the strip, cutting the strip between the sets of teeth, assembling the divided strips side by side, and connecting the assembled strips to provide the carding surface.

8. A method of making carding surfaces for flats, comprising forming a strip of such cross section as to provide a thickened base, providing a plurality of spaced sets of teeth on the upper part of said strip, the thickness of the teeth throughout their length being less than that of the base, cutting the strip between the sets of teeth to provide a series of members each bearing one of the sets of teeth and provided with untoothed end portions, assembling the divided strips side by side, and connecting a series of said divided strips by applying securing means to the said untoothed portion and thus provide the carding surface.

9. A method of making carding surfaces for flats, comprising forming a strip with a series of longitudinally spaced sets of teeth, the face of the strip from which the teeth project being serrated in the spaces between the sets of teeth, cutting the strip to provide a series of short strips each including one of the sets of teeth and a base section having serrated ends, assembling a series of the divided strips side by side, and applying clamping means to the serrated end portions to hold the strips together and thus form the carding surface.

10. A toothed strip for carding surfaces comprising a base having on its upper face a set of straight, rigid and pointed teeth all inclined in the same direction, the said base being thicker than any portion of the teeth and provided at its ends, beyond the teeth thereon, with untoothed portions.

11. For use in the manufacture of carding surfaces, a toothed strip having sets of spaced teeth extending from the base portion, said sets being separated one from another and the said teeth of each set being straight and rigid and also tapered towards their outer ends and inclined in the said direction.

12. For use in the manufacture of carding surfaces, a strip having a continuous base on the upper part of which are provided a plurality of spaced sets of rigid, straight and pointed teeth all inclined in the same direction, the said base being thickened relatively to the width of the teeth, and the upper edges of the untoothed portions between the sets of teeth being substantially in line with the bottoms of the teeth.

JOHN PLATT.